(12) United States Patent
Jabado et al.

(10) Patent No.: US 8,277,194 B2
(45) Date of Patent: Oct. 2, 2012

(54) COMPONENT TO BE ARRANGED IN THE FLOW CHANNEL OF A TURBOMACHINE AND SPRAYING METHOD FOR PRODUCING THE COATING

(75) Inventors: Rene Jabado, Berlin (DE); Jens Dahl Jensen, Berlin (DE); Ursus Krüger, Berlin (DE); Daniel Körtvelyessy, Berlin (DE); Ralph Reiche, Berlin (DE); Michael Rindler, Schöneiche (DE)

(73) Assignee: Siemens Aktiengesellschaft, München (DE)

( * ) Notice: Subject to any disclaimer, the term of this patent is extended or adjusted under 35 U.S.C. 154(b) by 963 days.

(21) Appl. No.: 12/087,796

(22) PCT Filed: Jan. 10, 2007

(86) PCT No.: PCT/EP2007/050216
§ 371 (c)(1),
(2), (4) Date: Dec. 8, 2008

(87) PCT Pub. No.: WO2007/082823
PCT Pub. Date: Jul. 26, 2007

(65) Prior Publication Data
US 2009/0092498 A1    Apr. 9, 2009

(30) Foreign Application Priority Data
Jan. 17, 2006  (EP) .................................. 060000953

(51) Int. Cl.
B63H 1/26  (2006.01)
B63H 7/02  (2006.01)
B64C 27/46  (2006.01)
F03B 3/12  (2006.01)
F03B 7/00  (2006.01)
F03D 11/02  (2006.01)
F04D 29/38  (2006.01)
B64C 11/16  (2006.01)
F01D 5/14  (2006.01)

(52) U.S. Cl. ............. 416/241 B; 416/241 R; 427/419.1; 427/258

(58) Field of Classification Search .................. None
See application file for complete search history.

(56) References Cited

U.S. PATENT DOCUMENTS
4,650,138 A    3/1987  Grose
4,706,910 A    11/1987 Walsh et al.
(Continued)

FOREIGN PATENT DOCUMENTS
CH    351301    1/1961
(Continued)

OTHER PUBLICATIONS

Communication from Japanese Patent Office, Aug. 23, 2011, pp. 1-4.

*Primary Examiner* — Julio J Maldonado
*Assistant Examiner* — Shantanu C Pathak

(57) ABSTRACT

The invention relates to a component for arrangement in the duct of a turbine engine. The component is provided with a coating, which has a surface structure with scales which overlap each other in the direction of flow of the turbine engine. The invention also relates to a spraying method for generating a coating on a component.

7 Claims, 6 Drawing Sheets

U.S. PATENT DOCUMENTS

| | | |
|---|---|---|
| 5,652,044 A | 7/1997 | Rickerby |
| 5,860,626 A | 1/1999 | Moser |
| 5,861,226 A * | 1/1999 | Horne et al. .................. 430/5 |
| 6,345,791 B1 | 2/2002 | McClure |
| 6,528,118 B2 * | 3/2003 | Lee et al. .................. 427/258 |
| 2002/0066770 A1 * | 6/2002 | James et al. .................. 228/119 |
| 2002/0102360 A1 * | 8/2002 | Subramanian et al. .... 427/419.1 |

FOREIGN PATENT DOCUMENTS

| | | |
|---|---|---|
| DE | 36 09 541 A1 | 9/1987 |
| DE | 38 35 213 A1 | 5/1990 |
| DE | 100 00 780 A1 | 8/2000 |
| DE | 101 26 100 A1 | 12/2002 |
| EP | 0 486 489 B1 | 5/1992 |
| EP | 0 702 130 A2 | 3/1996 |
| EP | 0 786 017 B1 | 7/1997 |
| EP | 0 412 397 B1 | 3/1998 |
| EP | 1 204 776 B1 | 5/2002 |
| EP | 1 306 454 A1 | 5/2003 |
| EP | 1 319 729 A1 | 6/2003 |
| EP | 1 506 816 A1 | 2/2005 |
| JP | 63062858 A | 3/1988 |
| JP | 01182504 A1 | 7/1989 |
| JP | 02247372 A | 10/1990 |
| WO | WO 99/67435 A1 | 12/1999 |
| WO | WO 00/44949 A1 | 8/2000 |

* cited by examiner

COMPONENT TO BE ARRANGED IN THE FLOW CHANNEL OF A TURBOMACHINE AND SPRAYING METHOD FOR PRODUCING THE COATING

CROSS REFERENCE TO RELATED APPLICATIONS

This application is the US National Stage of International Application No. PCT/EP2007/050216, filed Jan. 10, 2007 and claims the benefit thereof. The International Application claims the benefit of European application No. EP 06000953.7 filed Jan. 17, 2006, both of the applications are incorporated by reference herein in their entirety.

FIELD OF THE INVENTION

The present invention relates to a component which is to be arranged in the flow channel of a turbomachine and has a coating. The invention furthermore relates to a spraying method for producing a coating with a three-dimensional surface structure.

BACKGROUND OF THE INVENTION

Turbomachines such as gas turbine systems represent systems with very highly developed efficiencies. Attempts are nevertheless being made to further raise the efficiencies of these machines. Even increasing the efficiency by fractions of a percent nowadays leads to a competitive advantage for gas turbine systems. Parameters which affect the efficiency are for example the combustion temperature in the turbomachine, the degree of combustion of the fuel or the flow properties of the components lying in the flow channel.

SUMMARY OF THE INVENTION

It is therefore an object of the present invention to provide a component which is to be arranged in the flow channel of a turbomachine and makes it possible to increase the efficiency.

It is another object of the present invention to provide a spraying method for generating a coating on a component, with which a coating that makes it possible to increase the efficiency of the system can be produced.

The objects are achieved by the independent claims. The dependent claims contain advantageous configurations of the invention.

A component according to the invention, which is to be arranged in the flow channel of a turbomachine, is provided with a coating that has a surface structure with scales which mutually overlap in the flow direction. The overlapping scales make it possible to configure the coating in the manner of a shark skin and thus reduce the flow resistance which the component presents to the flowing medium. By reducing the flow resistance, the efficiency of the system can be increased.

The component may in particular be designed as a turbine blade for use in a gas turbine system. If it is designed as a guide vane or rotor blade of the turbine, the efficiency of the gas turbine system can be increased owing to the more favorable flow properties. If it is designed as a guide vane or rotor blade of a compressor, then the improved flow properties reduce the friction between the air to be compressed and the compressor blades, the effect of which is that the temperature of the compressed air at the compressor outlet is reduced compared to compressors with conventional blades. The reduced compressor outlet temperature also leads to an increase in the efficiency of the gas turbine system.

It is particularly advantageous for the scales to be provided with grooves which extend in the flow direction, when the component is installed in the turbomachine. The scales with the grooves extending in the flow direction can closely approximate a real shark skin, which has particularly favorable flow properties, so that the coating can also have the favorable flow properties.

If the component is provided with a coating which prevents corrosion of the component and/or a coating which prevents oxidation of the component and/or a thermal barrier coating, this coating or these coatings may be applied in the aforementioned scale form. In the case of components for gas turbines, MCrAlX coatings in particular may be employed as corrosion-preventing and/or oxidation-preventing coatings and ceramic coatings may be employed as a thermal barrier coating.

In the spraying method for producing a coating with a three-dimensional surface structure on a component, at least one mask with at least one mask opening is employed during the coating. In a first variant of the method, the at least one mask is positioned in chronological sequence so that the positions of the mask opening partially overlap in two chronologically successive positions of the mask. In a second method, the spraying is carried out from a spraying direction which is inclined relative to the normal of the surface to be coated, a mask being used which comprises masking sections that extend at least on average perpendicularly both to the spraying direction and to the normal. These masking sections may have a profile oscillating about a midline extending perpendicularly to the spraying direction and the normal. In both cases, the spraying process leads to the formation of a scale-like structure of the coating. The described coatings with reduced flow resistance can be produced in this way. Coatings with a particularly low flow resistance may be produced when the chronological overlap of the mask openings takes place in a direction in a fluid is subsequently intended to flow along the coated component, or the spraying direction is inclined relative to this direction.

In a particularly advantageous configuration of the spraying method, the mask comprises slots as mask openings. In this way, it is possible to produce coatings with scale structures in which the scales have grooves. The grooves may in particular extend in the direction of the overlap. In this way it is possible to prevent transverse flows on the future coated component, i.e. flows along the component surface which extend transversely to the flow direction per se, and this reduces the flow resistance of the component.

A thermal spraying method may be employed in order to produce the coating, for example plasma spraying or in particular cold gas spraying.

BRIEF DESCRIPTION OF THE DRAWINGS

Further features, properties and advantages of the present invention may be found in the following description of an exemplary embodiment with reference to the appended figures.

DETAILED DESCRIPTION OF THE INVENTION

Figure 1:
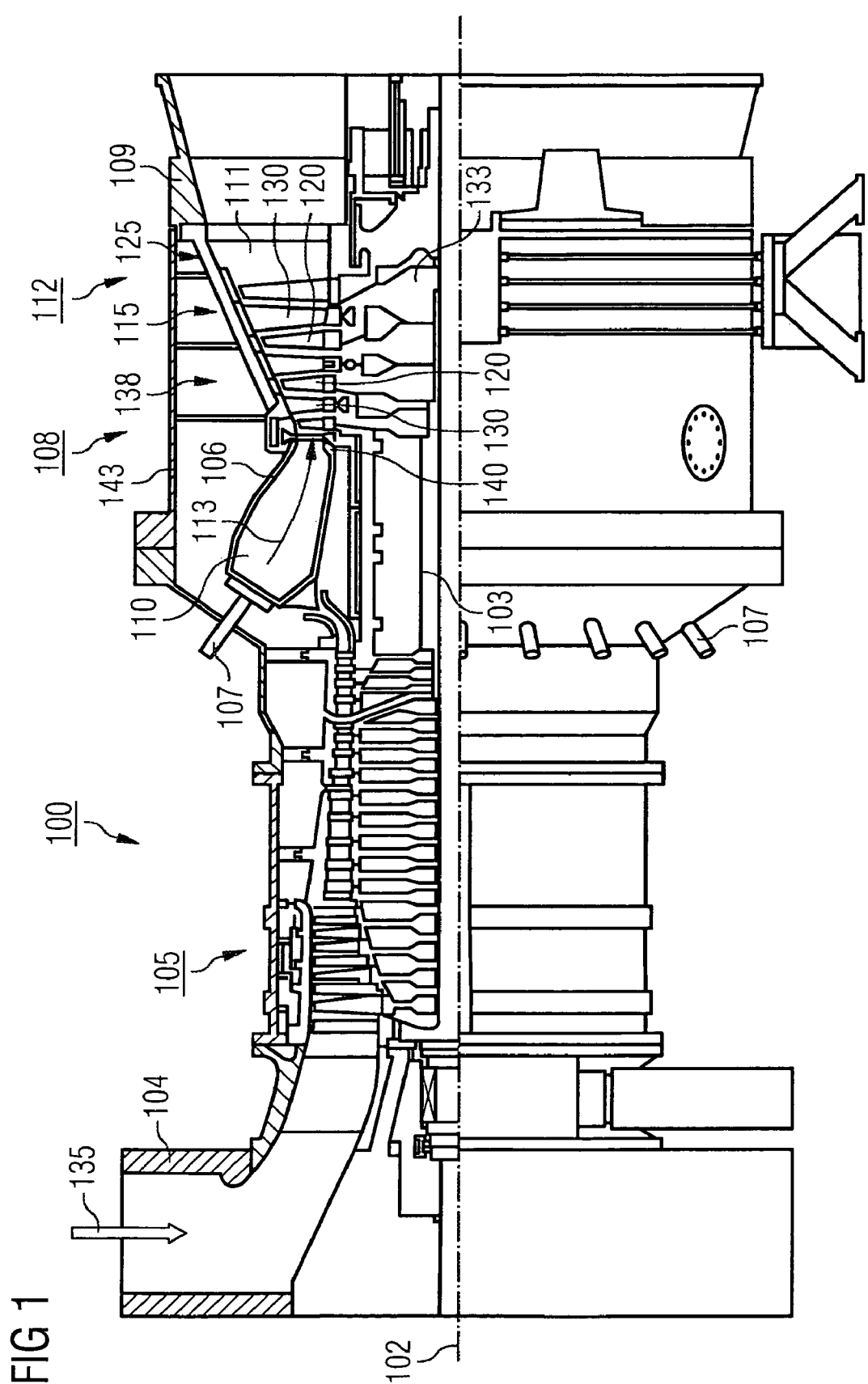
FIG. 1 shows a gas turbine by way of example in a partial longitudinal section.

FIG. 1 shows a gas turbine 100 by way of example in a partial longitudinal section. The gas turbine 100 internally comprises a rotor 103, which will also be referred to as the turbine rotor, mounted so as to rotate about a rotation axis 102. Successively along the rotor 103, there are an intake manifold 104, a compressor 105, an e.g. toroidal combustion chamber 110, in particular a ring combustion chamber 106, having a plurality of burners 107 arranged coaxially, a turbine 108 and the exhaust manifold 109.

The ring combustion chamber 106 communicates with an e.g. annular hot gas channel 111. There, for example, four successively connected turbine stages 112 form the turbine 108.

Each turbine stage 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fitted on the rotor 103, for example by means of a turbine disk 133.

Coupled to the rotor 103, there is a generator or a work engine (not shown).

During operation of the gas turbine 100, air 135 is taken in and compressed by the compressor 105 through the intake manifold 104. The compressed air provided at the end of the compressor 105 on the turbine side is delivered to the burners 107 and mixed there with a fuel. The mixture is then burnt to form the working medium 113 in the combustion chamber 110. From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 experience thermal loads. Apart from the heat shield elements lining the ring combustion chamber 106, the guide vanes 130 and rotor blades 120 of the first turbine stage 112, as seen in the flow direction of the working medium 113, are heated the most.

In order to withstand the temperatures prevailing there, they may be cooled by means of a coolant.

Substrates of the components may likewise comprise a directional structure, i.e. they are monocrystalline (SX structure) or comprise only longitudinally directed-grains (DS structure).

Iron-, nickel- or cobalt-based superalloys used as material for the components, in particular for the turbine blades 120, 130 and components of the combustion chamber 110. Such superalloys are known for example from EP 1 204 776 B1, EP 1 306 454, EP 1 319 729 A1, WO 99/67435 or WO 00/44949 are used; with respect to the chemical composition of the alloys, these documents are part of the disclosure.

The blades 120, 130 may likewise have coatings against corrosion (MCrAlX; M is at least one element from the group ion (Fe), cobalt (Co), nickel (Ni), X is an active element and stands for yttrium (Y) and/or silicon and/or at least one rare earth element, or hafnium). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

On the MCrAlX, there may furthermore be a thermal barrier layer which consists for example of $ZrO_2$, $Y_2O_3$—$ZrO_2$, i.e. it is not stabilized or is partially or fully stabilized by yttrium oxide and/or calcium oxide and/or magnesium oxide. Rod-shaped grains are produced in the thermal barrier layer by suitable coating methods, for example electron beam deposition (EB-PVD).

The guide vane 130 comprises a guide vane root (not shown here) facing the inner housing 138 of the turbine 108, and a guide vane head lying opposite the guide vane root. The guide vane head faces the rotor 103 and is fixed on a fastening ring 140 of the stator 143.

Figure 2:
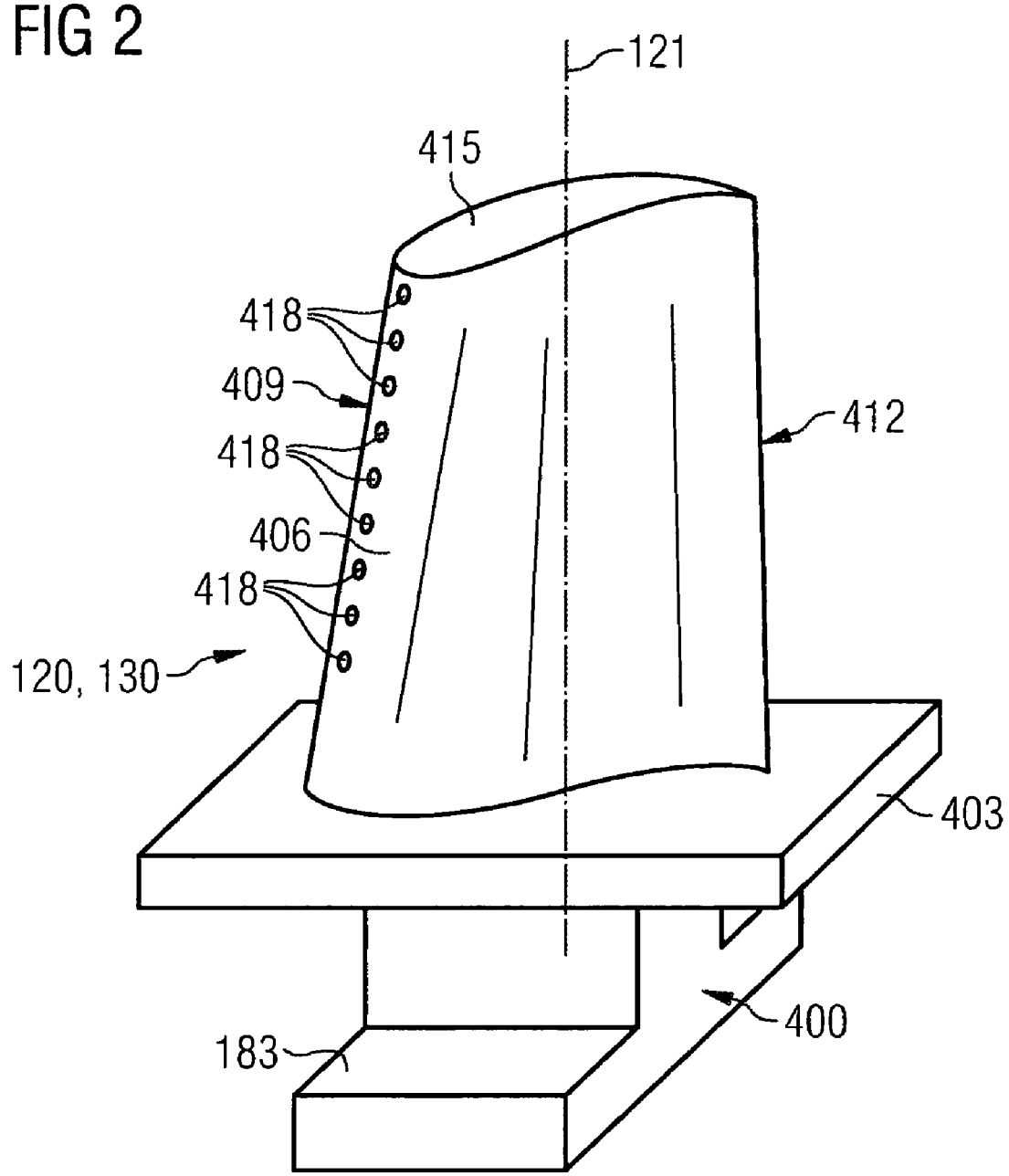
FIG. 2 shows a perspective view of a rotor blade or guide vane of a turbomachine.

FIG. 2 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

The blade 120, 130 comprises, successively along the longitudinal axis 121, a fastening zone 400, a blade platform 403 adjacent thereto as well as a blade surface 406. As a guide vane 130, the vane 130 may have a further platform (not shown) at its vane tip 415.

A blade root 183 which is used to fasten the rotor blades 120, 130 on a shaft or a disk (not shown) is formed in the fastening zone 400. The blade root 183 is configured, for example, as a hammerhead. Other configurations as a firtree or dovetail root are possible.

The blade 120, 130 comprises a leading edge 409 and a trailing edge 412 for a medium which flows past the blade surface 406.

In conventional blades 120, 130, for example solid metallic materials, in particular superalloys, are used in all regions 400, 403, 406 of the blade 120, 130. Such superalloys are known for example from EP 1 204 776 B1, EP 1 306 454, EP 1 319 729 A1, WO 99/67435 or WO 00/44949; with respect to the chemical composition of the alloy, these documents are part of the disclosure. The blades 120, 130 may in this case be manufactured by a casting method, also by means of directional solidification, by a forging method, by a machining method or combinations thereof.

Workpieces with a monocrystalline structure or structures are used as components for machines which are exposed to heavy mechanical, thermal and/or chemical loads during operation. Such monocrystalline workpieces are manufactured, for example, by directional solidification from the melts. These are casting methods in which the liquid metal alloy is solidified to form a monocrystalline structure, i.e. to form the monocrystalline workpiece, or is directionally solidified. Dendritic crystals are in this case aligned along the heat flux and form either a rod crystalline grain structure (columnar, i.e. grains which extend over the entire length of the workpiece and in this case, according to general terminology usage, are referred to as directionally solidified) or a monocrystalline structure, i.e. the entire workpiece consists of a single crystal. It is necessary to avoid the transition to globulitic (polycrystalline) solidification in these methods, since nondirectional growth will necessarily form transverse and longitudinal grain boundaries which negate the beneficial properties of the directionally solidified or monocrystalline component. When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures. Such methods are known from U.S. Pat. No. 6,024,792 and EP 0 892 090 A1; these documents are part of the disclosure.

The blades 120, 130 may likewise have coatings against corrosion or oxidation (MCrAlX; M is at least one element from the group ion (Fe), cobalt (Co), nickel (Ni), X is an active element and stands for yttrium (Y) and/or silicon and/or at least one rare earth element, or hafnium (Hf)). Such alloys are known from EP 0 486 489 B1, EP 0 786 017 B1, EP 0 412 397 B1 or EP 1 306 454 A1, which are intended to be part of this disclosure.

On the MCrAlX, there may furthermore be a thermal barrier layer, which is preferably the outermost layer and consists for example of $ZrO_2$, $Y_2O_3$—$ZrO_2$, i.e. it is not stabilized or is partially or fully stabilized by yttrium oxide and/or calcium oxide and/or magnesium oxide. Rod-shaped grains are produced in the thermal barrier layer by suitable coating methods, for example electron beam deposition (EB-PVD).

Refurbishment means that components 120, 130 may need to have protective layers taken off (for example by sandblasting) after their use. The corrosion and/or oxidation layers or products are then removed. Optionally, cracks in the component 120, 130 are also repaired. The components 120, 130 are then recoated and the components 120, 130 are used again.

The blade 120, 130 may be designed to be hollow or solid. If the blade 120, 130 is intended to be cooled, it will be hollow and optionally also comprise film cooling holes 418 (indicated by dashes).

Figure 3:
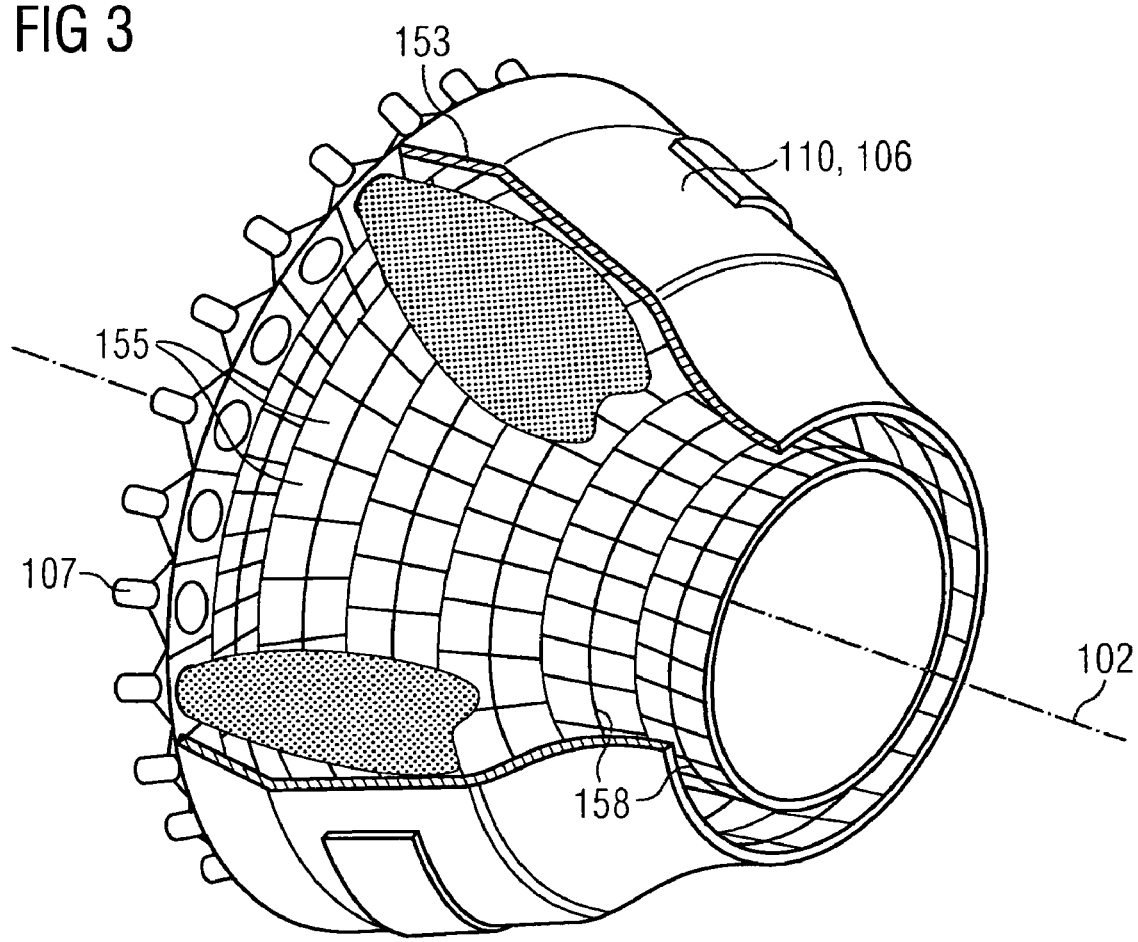
FIG. 3 shows a combustion chamber of a gas turbine system.

FIG. 3 shows a combustion chamber 110 of a gas turbine. The combustion chamber 110 is designed for example as a so-called ring combustion chamber, in which a multiplicity of burners 107 are arranged in the circumferential direction around a rotation axis 102, open into a common combustion chamber space. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Each heat shield element 155 is equipped with a particularly heat-resistant protective layer on the working medium side, or is made of refractory material. This may comprise solid ceramic blocks or alloys with MCrAlX and/or ceramic coatings. The materials of the combustion chamber wall and coatings thereof may be similar to the turbine blades.

Owing to the high temperatures inside the combustion chamber 110, a cooling system may also be provided for the heat shield elements 155 or for their retaining elements.

The combustion chamber 110 is in particular configured for detecting losses of the heat shield elements 155. To this end, a number of temperature sensors 158 are positioned between the combustion chamber wall 153 and the heat shield elements 155.

Figure 4:
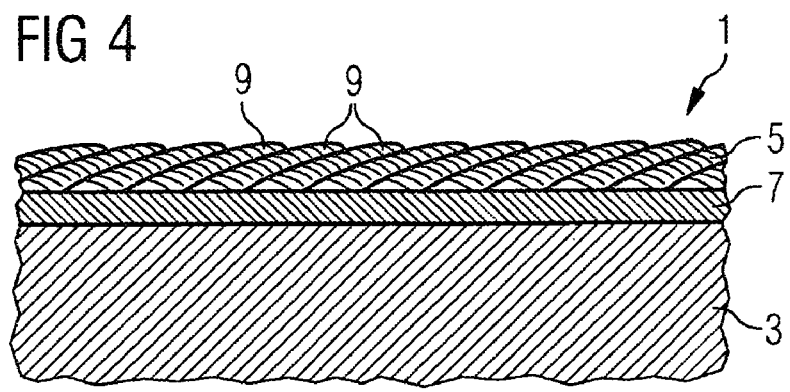
FIG. 4 shows a highly schematized sectional view of a component with a coating, which has a scale-like surface structure.

FIG. 4 shows a highly schematized detail of a gas turbine blade 1 as an exemplary embodiment of a component according to the invention. A coating 5, which has a scale-like surface structure, is applied on the base material 3 of the turbine blade 1. In the present exemplary embodiment, the coating 5 is a ceramic thermal barrier layer. Below this, there is an MCrAlX coating 7 which serves on the one hand as an adhesion promoter between the base material and the ceramic coating 5 and on the other hand as an oxidation- and corrosion-preventing coating.

The ceramic coating 5 is constructed from a multiplicity of scales 9, which mutually overlap partially. The surfaces of the individual scales 9 also have grooves 11. The overlap of the scales 9 and the orientation of the grooves 11 are selected so that the overlap takes place in a flow direction S, in which the combustion exhaust gases flow along the surface of the turbine blade 1 when it is installed in a gas turbine system. The selected orientation avoids the formation of transverse flows along the surface of the turbine blade 1, which would increase the coefficient of friction of the turbine blade 1.

Figure 5:
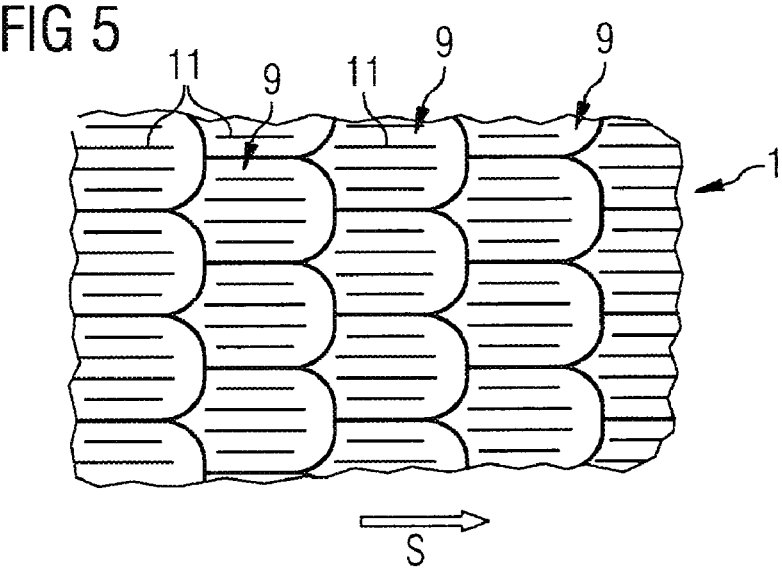
FIG. 5 shows the detail represented in FIG. 4 in plan view.

Although the individual scale rows are arranged mutually offset in FIG. 5, in a variant of this configuration the offset of the individual scale rows may also be obviated.

Figure 6:
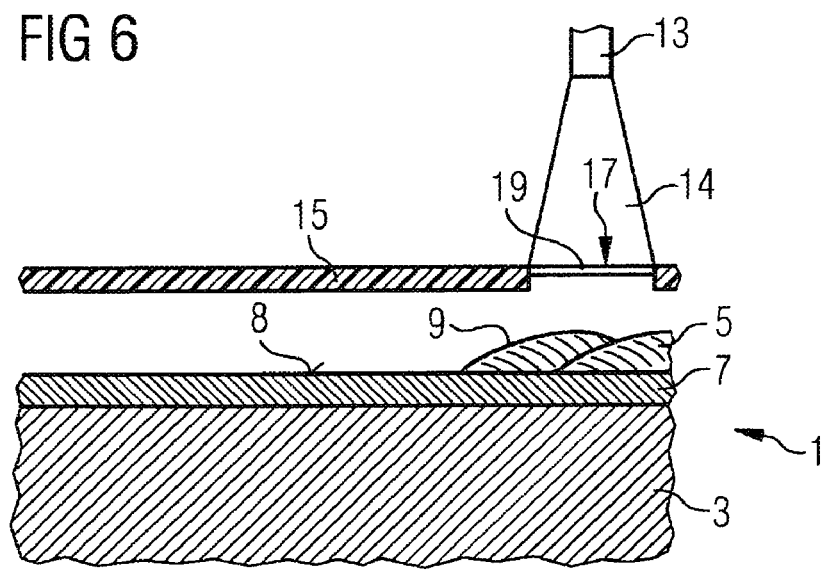
FIG. 6 shows a first step of a spraying method for producing the coating shown in FIGS. 4 and 5.
Figure 7:
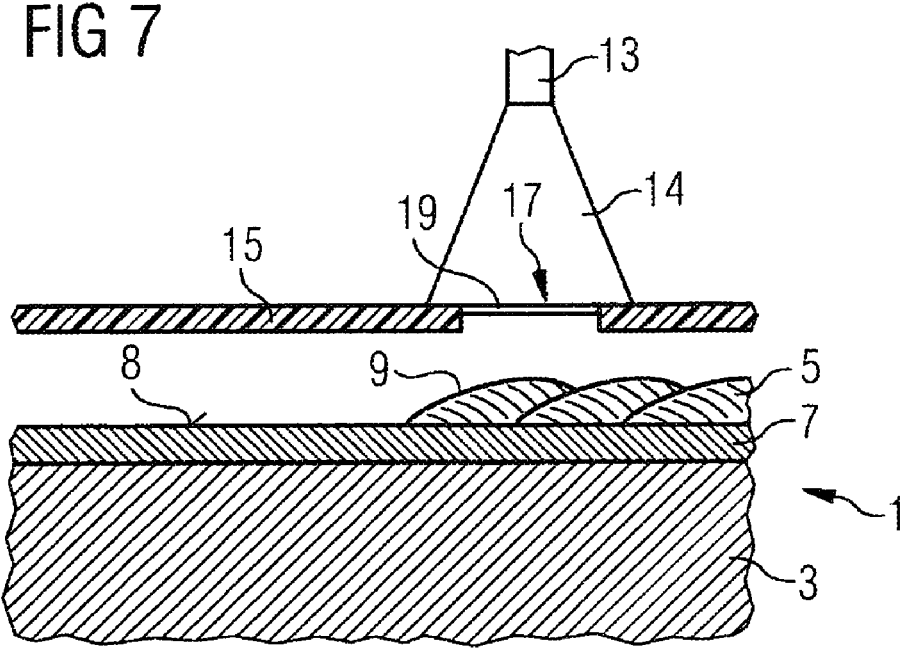
FIG. 7 shows a second step of the production of the coating shown in FIGS. 4 and 5.

A method for producing the coating represented in FIGS. 4 and 5 with a scale-like surface is represented in FIGS. 6 and 7. The coating 5 is produced by a thermal spray method, in the present exemplary embodiments by a so-called cold gas spraying method. In a cold gas spraying method, a gas jet is accelerated to ultrasonic velocity by means of a Laval nozzle. Particles of the coating material are introduced into the gas jet, these being entrained by the gas jet and propelled onto the surface to be coated. Owing to the high velocities of the particles they melt at least partially when striking the surface, and they form the coating after they have resolidified.

FIG. 6 shows the turbine blade 1 to be coated, in which the MCrAlX coating 7 has already been applied onto the base material 3. The ceramic thermal barrier layer 5 is also already partially produced. The ceramic particles used to produce the coating 5 are propelled onto the surface 8 of the MCrAlX coating by means of the Laval nozzle 13, a mask 15 ensuring that the ceramic particles reach the surface 8 only in a restricted area i.e. wherever new scales are intended to be formed.

The part of the surface 8 exposed through the mask opening 17 partially overlaps with already existing scales 9. The material applied by means of the'cold gas spraying method is therefore deposited partly on the uncovered surface 8 and partly on already existing scales 9. In this way, a new scale 9 is created. After the scale 9 has been produced, the mask is displaced until the mask opening 17 again lies partly over an uncovered surface of the MCrAlX layer and partly over the scale 9 formed previously. By repeating this process until the entire surface 8 of the MCrAlX coating 7 has been coated with the thermal barrier layer 5, it is possible to produce the scale-like surface structure of the thermal barrier layer 5 as shown in FIGS. 4 and 5.

Figure 8:
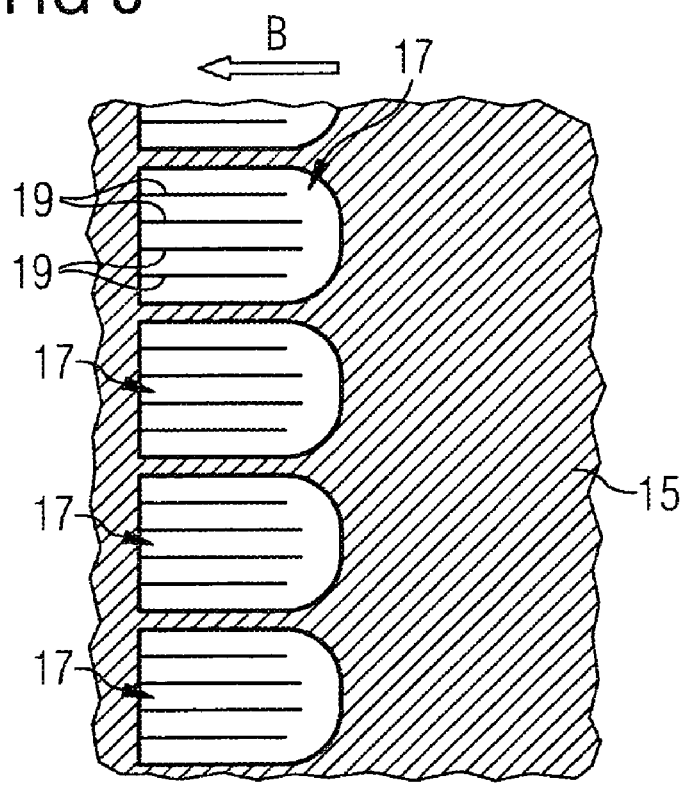
FIG. 8 shows the mask which is used in the method shown with reference to FIGS. 6 and 7.

The mask 15 used in the method just described is schematically represented in FIG. 8. The mask 15 comprises a number of mask openings 17, which are arranged next to one another in a direction that runs perpendicularly to the movement direction B of the mask when the ceramic thermal barrier layer 5 is being produced. Each mask opening 17 comprises a number of masking strips 19, which extend essentially in the movement direction of the mask 15. Less coating material reaches the surface 8 in the surface regions covered by these washing strips, so that the grooves 11 are formed there.

Figure 9:
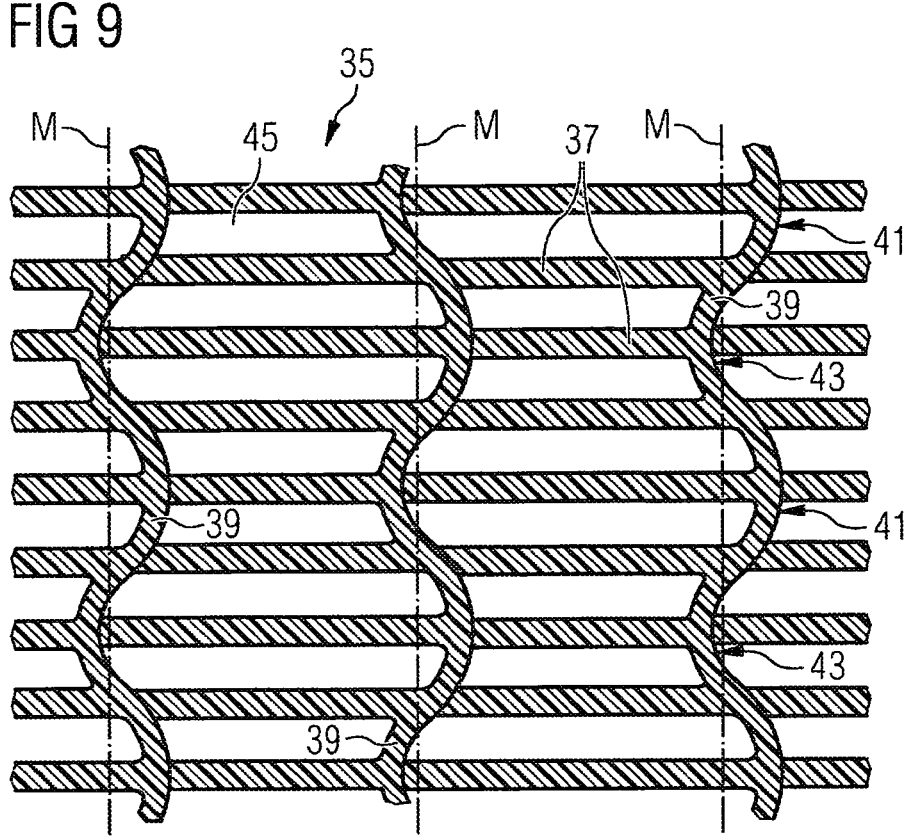
FIG. 9 shows an alternative mask for producing a coating.

An alternative mask 35, which may be used in an alternative method for producing a coating with a scale-like surface structure, is represented in FIG. 9. This mask 35 is constructed essentially in the form of a lattice with lattice bars 35, 39 as masking sections, first lattice bars 37 extending in a first direction and second lattice bars 39 extending in a second direction which runs essentially perpendicularly to the first direction. The second lattice bars 39 are designed in an undulating fashion and respectively oscillate about an imaginary midline M. Mutually neighboring second lattice bars 39 are offset so that the wave crests 41 of a second lattice bar 39 lie where the wave troughs 34 are located on the neighboring second lattice bars 39. In this way, it is possible to achieve an offset of neighboring scale rows as represented in FIG. 5. It should however be pointed out that the crests 41 and troughs 43 of the second lattice bars 39 do not necessarily have to be mutually displaced. In such a case, the resulting scale-like surface structure of the coating will likewise not have an offset of neighboring scale rows.

Figure 10:
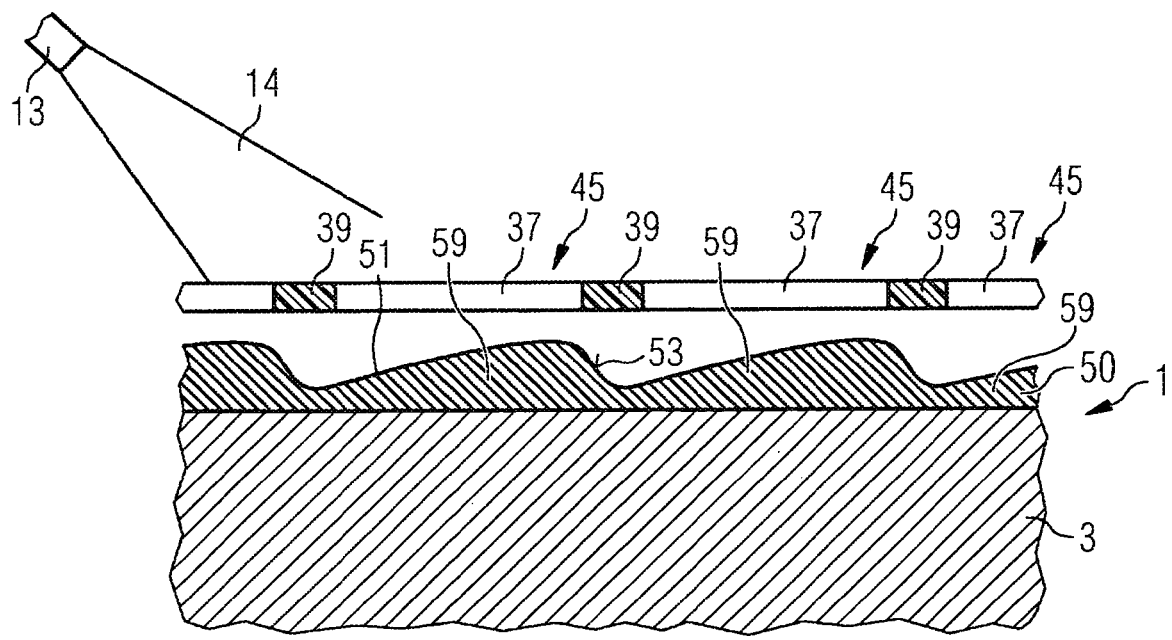
FIG. 10 shows production of the coating by using the mask shown in FIG. 9.

The use of the mask 35 represented in FIG. 9 in an alternative method for producing a coating 50 with a scale-like surface structure is schematically represented in FIG. 10. In the method represented in FIG. 10, the same cold gas spraying method is employed as was described with reference to FIGS. 6 and 7. In contrast to the method described previously, however, the high-velocity gas jet 14 is not directed perpendicularly onto the surface; rather, it makes an angle with the surface normal. In other words, it is tilted in a direction which runs against the flow direction S.

An asymmetric structure of the coating 50 is formed owing to the oblique incidence of the coating particles, which leads to the creation of the scale-like surface structure. The tilt of the Laval nozzle 13 is selected so that the leading-edge regions 51 of the scales 59 have a shallow upward gradient 51. The trailing-edge regions 53 of the scales 59, on the other hand, descend steeply compared with the leading-edge regions 51. The tilt angle lies in the range of between 20° and 40°, as seen from the normal.

When producing the coating 50, the mask 35 is oriented so that the first lattice bars 37 essentially extend in the future flow direction S and the imaginary midlines M of the second lattice bars 39 extend perpendicularly to the future flow direction S. The second lattice bars 39 are used primarily to produce the scales 59, while the first lattice bars 37 used to form the grooves 11 in the surfaces of the scales 59. The mask 35 is preferably made of a flexible material, so that it is adapted to the geometry of the surface to be coated on the turbine blade 1.

The mask 35 used in the second exemplary embodiment for producing the coating 50 with a scale-like surface structure offers the advantage, over the mask 15 used in the first exemplary embodiment, that the complete coating can be produced without the mask needing to be displaced.

At this point, it should be pointed out that the coating 50 represented in FIG. 10 is applied directly onto the surface of the base material 3 of the turbine blade 1. This may for example be the case when the coating 50 represents a corrosion- and/or oxidation-preventing coating for a guide vane or rotor blade of the compressor. With the method described with reference to FIG. 10, however, it is also possible to produce a thermal barrier coating which is applied onto an MCrAlX coating or another adhesion-promoting coating. In the method described with reference to FIGS. 6 and 7, it is likewise possible to apply a coating directly onto the surface of the base material 3 i.e. without the use of an adhesion-promoting layer.

The invention claimed is:

1. A spraying method for producing a coating on a component of a gas turbine engine, comprising:
    moving a mask with a mask opening to a first position such that the mask opening is aligned with a first restricted area of the component;
    propelling ceramic particles through the mask opening in the first position and onto the first restricted area of the component;
    forming scales in the first restricted area, based on the propelling of the ceramic particles through the mask opening in the first position, said scales in the first restricted area being aligned with a flow direction of combustion exhaust gas relative to the component;
    moving the mask with the mask opening to a second position such that the mask opening is aligned with a second restricted area of the component;
    propelling ceramic particles through the mask opening in the second position and onto the second restricted area of the component, said second restricted area having a partial overlap with the first restricted area in the flow direction of combustion exhaust gas relative to the component; and
    forming scales in the second restricted area, based on the propelling of the ceramic particles through the mask opening in the second position, said scales in the second restricted area having a partial overlap with the scales in the first restricted area in the flow direction of the combustion exhaust gas relative to the component.

2. The spraying method of claim 1, wherein the propelling steps are performed such that the ceramic particles are propelled at an inclined angle relative to a normal to a surface of the component.

3. The spraying method of claim 1, further comprising forming grooves on the scales in the first restricted area and on the scales in the second restricted area, wherein said grooves are aligned with the flow direction of the combustion exhaust gas relative to the component.

4. The spraying method of claim 1, wherein the propelling of ceramic particles onto the second restricted area are partially directed onto a portion of the scales in the first restricted area which extend into the second restricted area and are partially directed onto the component in the second restricted area.

5. The spraying method of claim 1, wherein the mask comprises a plurality of mask openings, said plurality of mask openings are arranged next to one another in a direction perpendicular to a movement direction of the mask from the first position to the second position.

6. The spraying method of claim 2, further comprising:
    adjusting the inclined angle relative to the normal to the surface;
    adjusting a form of a trailing edge region of the scales, based on the adjusting of the inclined angle;
    adjusting a form of a leading edge region of the scales opposite to the trailing edge region, based on the adjusting of the inclined angle.

7. The spraying method of claim 6, wherein the inclined angle ranges between 20 degrees and 40 degrees.

* * * * *